US008375041B2

(12) United States Patent
Webster et al.

(10) Patent No.: US 8,375,041 B2
(45) Date of Patent: Feb. 12, 2013

(54) PROCESSING QUERIES AGAINST COMBINATIONS OF DATA SOURCES

(75) Inventors: Richard David Webster, Richmond (CA); Richard Bruce Cameron, Vancouver (CA)

(73) Assignee: Business Objects Software Ltd, Dublin (IE)

( * ) Notice: Subject to any disclaimer, the term of this patent is extended or adjusted under 35 U.S.C. 154(b) by 243 days.

(21) Appl. No.: 11/515,441

(22) Filed: Aug. 31, 2006

(65) Prior Publication Data

US 2008/0059449 A1 Mar. 6, 2008

(51) Int. Cl.
G06F 17/30 (2006.01)
G06F 7/00 (2006.01)

(52) U.S. Cl. .................. 707/759; 707/769; 707/803
(58) Field of Classification Search .................. None
See application file for complete search history.

(56) References Cited

U.S. PATENT DOCUMENTS

| | | | |
|---|---|---|---|
| 6,473,764 B1 * | 10/2002 | Petculescu et al. | 707/603 |
| 6,493,699 B2 * | 12/2002 | Colby et al. | 1/1 |
| 6,643,668 B2 | 11/2003 | Sluiman | |
| 6,684,207 B1 * | 1/2004 | Greenfield et al. | 707/3 |
| 6,768,986 B2 | 7/2004 | Cras et al. | |
| 6,931,418 B1 * | 8/2005 | Barnes | 707/103 R |
| 2002/0073125 A1 | 6/2002 | Bier | |
| 2002/0087516 A1 * | 7/2002 | Cras et al. | 707/2 |
| 2002/0089532 A1 | 7/2002 | Cohen et al. | |
| 2002/0156799 A1 | 10/2002 | Markel et al. | |
| 2003/0115194 A1 * | 6/2003 | Pitts et al. | 707/3 |
| 2004/0034651 A1 | 2/2004 | Gupta et al. | |
| 2004/0093412 A1 * | 5/2004 | Chen et al. | 709/224 |
| 2004/0122844 A1 * | 6/2004 | Malloy et al. | 707/102 |
| 2004/0181538 A1 * | 9/2004 | Lo et al. | 707/100 |
| 2004/0243593 A1 * | 12/2004 | Stolte et al. | 707/100 |
| 2005/0010565 A1 * | 1/2005 | Cushing et al. | 707/3 |

OTHER PUBLICATIONS

"Microsoft Computer Dictionary", 2002, Microsoft Press, Fifth Edition, p. 375.*

* cited by examiner

*Primary Examiner* — Usmaan Saeed
*Assistant Examiner* — Michele Choi
(74) *Attorney, Agent, or Firm* — Mintz, Levin, Cohn, Ferris, Glovsky and Popeo P.C.

(57) ABSTRACT

The invention includes a computer readable medium with executable instructions to receive a query based on nested semantic abstractions for corresponding data sources. Data source specific queries are constructed based on the query by executing the query against the nested semantic abstractions. Each data source specific query is associated with an underlying data source described by a nested semantic abstraction. The data source specific queries are executed to produce results and the results are returned.

11 Claims, 9 Drawing Sheets

PROCESSING QUERIES AGAINST COMBINATIONS OF DATA SOURCES

CROSS-REFERENCE TO RELATED APPLICATION

This application is related to the following concurrently filed, commonly owned patent applications, which are incorporated herein by reference: "Apparatus and Method For an Extended Semantic Layer with Multiple Combined Semantic Domains Specifying Data Model Objects", Ser. No. 11/515,404 and Patent Application Publication No. US 20080059413 A1, filed Aug. 31, 2006, and "Apparatus and Method for an Extended Semantic Layer Specifying Data Model Objects with Calculated Values", Ser. No. 11/515,405 and Patent Application Publication No. US 20080071799 A1, filed Aug. 31, 2006.

BRIEF DESCRIPTION OF THE INVENTION

This invention relates generally to constructing and processing database queries. More particularly, this invention relates to the use of queries with semantic abstractions that offer a layer of enriched representation of underlying data sources (e.g., relational data sources, OLAP data sources, and combinations thereof).

BACKGROUND OF THE INVENTION

Business Intelligence generally refers to software tools used to improve business enterprise decision-making. These tools are commonly applied to financial, human resource, marketing, sales, customer, and supplier analyses. More specifically, these tools can include: reporting and analysis tools to present information; content delivery infrastructure systems for delivery and management of reports and analytics; data warehousing systems for cleansing and consolidating information from disparate sources; and, data management systems, such as relational databases or On Line Analytic Processing (OLAP) systems used to collect, store, and manage raw data.

In many organizations data is stored in multiple formats that are not readily compatible, such as relational and OLAP data sources or combinations of different relational or different OLAP databases. Additionally, in many organizations it is desirable to insulate a user from the complexities of the underlying data source. Therefore, it is advantageous to be able to work with data using a semantic layer that provides terms and abstracted logic associated with the underlying data.

Semantic layers for relational databases are known in the art. It would be advantageous to enhance the architecture of known semantic layers to support abstractions of custom calculated dimensions and measures and to support the concept of hierarchies for dimensions. Likewise, it would be advantageous if a single query could be applied to a combination of data sources, such as relational data sources, OLAP data sources, and combinations thereof.

SUMMARY OF THE INVENTION

The invention includes a computer readable medium with executable instructions to receive a query based on nested semantic abstractions for corresponding data sources. Data source specific queries are constructed based on the query by executing the query against the nested semantic abstractions. Each data source specific query is associated with an underlying data source described by a nested semantic abstraction. The data source specific queries are executed to produce results and the results are returned.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
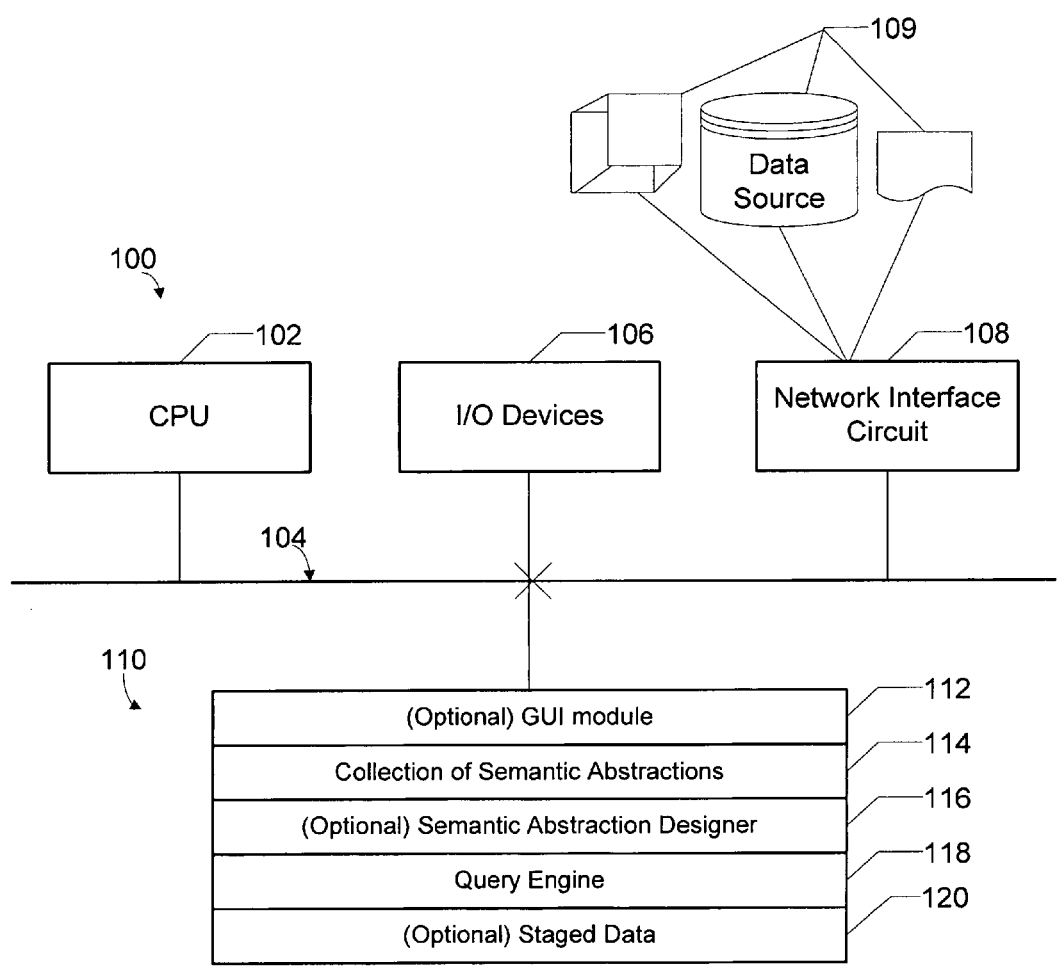
FIG. 1 illustrates a computer configured in accordance with an embodiment of the invention.

Semantic Abstraction is the term for a semantic layer that describes at least one underlying data source. A semantic domain is one type of semantic abstraction.

Semantic Domain is the term for a level of abstraction based on a relational, OLAP, or other data source. The abstraction may be based upon a combination of existing semantic domains. The semantic domain includes data model objects that describe the underlying data source and define dimensions, attributes and measures that can be applied to the underlying data source. The semantic domain may include data foundation metadata that describes a connection to, structure for, and aspects of the underlying data source. The term Combined Semantic Domain in particular is used to describe a semantic domain that describes the combination of two or more existing semantic domains, where the combined existing semantic domains include semantic domains that describes a relational data source, an OLAP data source or another combined semantic domain.

Data Model Object is the term for an object defined within a semantic domain that represents, defines, and provides metadata for a dimension, attribute or measure in an underlying data source. Data model objects can contain calculations from, based on or designed to be applied to an underlying data source. Types of data model objects include base dimensions, base attributes, base measures, calculated dimensions, calculated attributes, and calculated measures.

Base Dimension is a type of data model object that represents a side of a multidimensional cube, a category, a column or a set of data items within a data source. Each dimension represents a different category, such as region, time, or product type. Base dimension definitions support the specification of hierarchies. Members of a base dimension may be defined through a filter or transform.

Base Measure is a type of data model object that describes an aggregation of underlying data values based on governing dimensions. In the case of an OLAP data source, the measure may be defined directly in the source data. In the case of a relational data source, a column (or query expression), aggregation type, and governing dimensions are defined for the base measure. Types of aggregations include sum, count, maximum, minimum, average, first child, last child, and the like.

A Base Attribute is a type of data model object that is associated with a dimension and for each member for the dimension there is an attribute value. For example, a customer dimension might have attribute values for age, gender, and phone.

A Calculated Attribute is a type of data model object that is associated with a dimension and for each member of the dimension there is a calculated attribute value.

Calculated Dimension is a type of data model object where a dimension object contains members that are produced by a calculation. Members are determined dynamically based on the transformation of the underlying data or explicitly specified and bound to calculations. Member levels and hierarchies may be calculated as an aspect of a calculated dimension.

Calculated Measure is a type of data model object that is not bound directly to the underlying database. Instead, the object has a value expression that is evaluated to produce the values for the measure. These expressions may reference values of other measures (base measures or calculated ones) and may reference base and calculated dimensions for constraints and contexts. Calculated measures refer to values or ranges of values of a current measure or any other measures across subsets of the dimension space. Calculated measures can be used to calculate lead/lag values, and the like.

Hierarchy is the term used to describe the specified arrangement of dimension members within a dimension. A dimension contains one or more hierarchies. Members are associated with a level within the dimension. Members can be arranged as children of other members and form tree structures. Levels generally (but not necessarily) correspond to different depths within a hierarchy. A typical example is a geography hierarchy where levels include, country, state, city, store and the like. A hierarchy is used to interpret the calculation of measures, dimensions, and queries.

Dimension Member is the term used to describe a distinct value within a dimension, where the distinct value has a unique ID, display name, and/or attributes. A dimension member exists within one or more hierarchies.

Data foundation is the term used to describe metadata that characterizes how to access a data source. The data foundation may include metadata specifying the data structure and aspects of the data in the underlying data source, including the relationships between the data items.

FIG. 1 illustrates a computer 100 configured in accordance with an embodiment of the invention. The computer 100 has standard components, including a central processing unit 102, a bus 104, input/output devices 106, and an optional network interface circuit 108. The input/output devices 106 may include devices such as a keyboard, mouse, a display, such as a monitor and the like.

The optional network interface circuit 108 facilitates communications with networked computers (not shown) and data sources 109. Data sources may include OLAP data sources, relational databases and the like. The computer 100 also includes a memory 110. The memory 110 includes executable instructions to implement operations of the invention.

In the example of FIG. 1, the memory 110 includes an optional GUI module 112 to facilitate the creation, modification and querying of semantic abstractions and collections of semantic abstractions. The memory 110 also stores a collection of one or more semantic abstractions 114. An optional semantic abstraction designer 116 facilitates the design of semantic abstractions, including defining data model objects associated with semantic abstractions 114. A query engine 118 facilitates running queries based on a semantic abstraction 118. The query engine 118 parses a query and produces database specific queries that are run against data sources 109 based on semantic abstractions 114. Optionally, staged data 120 is also stored in memory 110 to support the activities of the query engine 118 or semantic abstraction designer 116.

For the purposes of illustration, the components are shown on a single computer. Modules may be located on different computers. It is the functions of the modules that are significant, not where they are performed or the specific manner in which they are performed.

Figure 2:
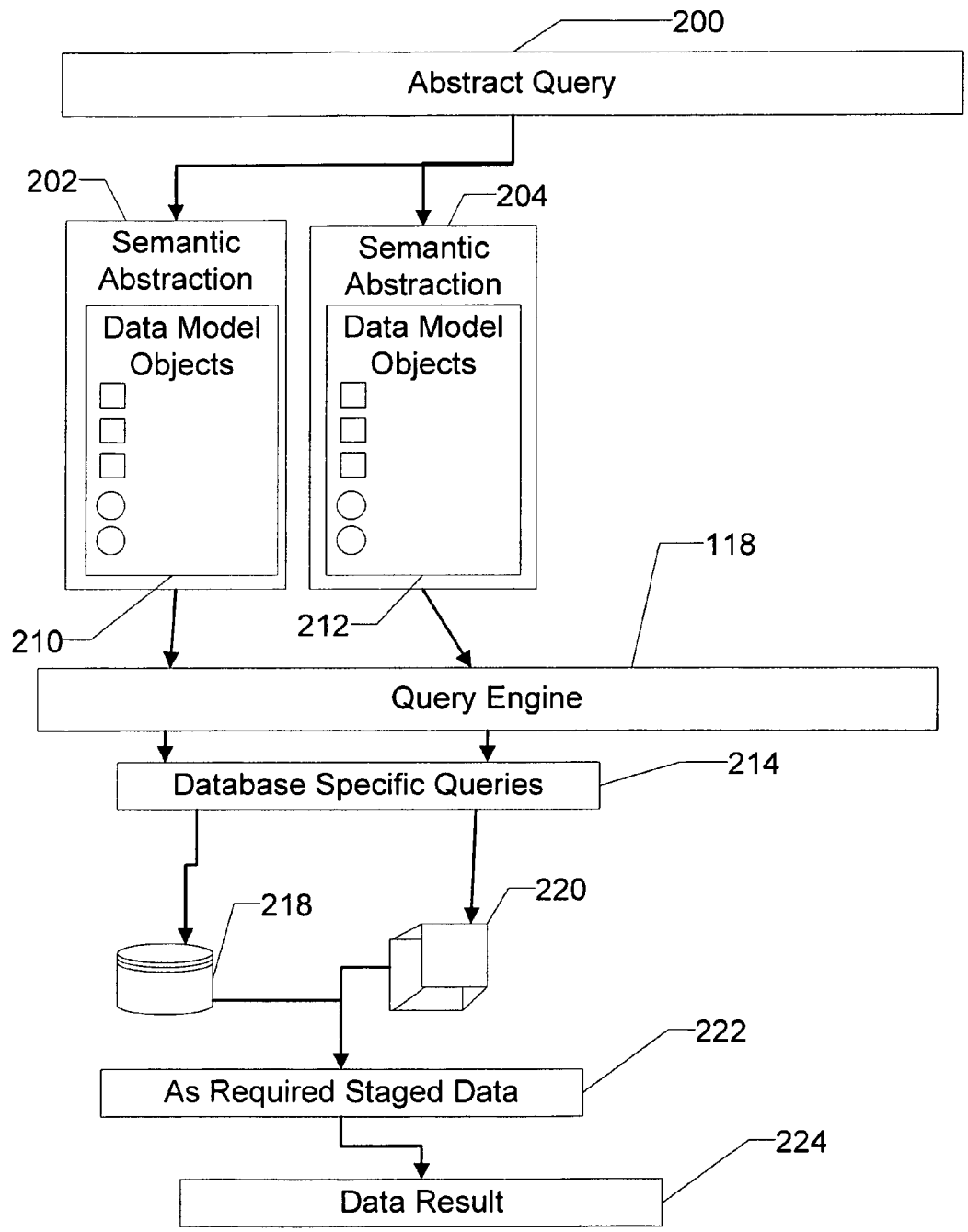
FIG. 2 illustrates an architecture associated with a query process executed in accordance with an embodiment of the invention.

FIG. 2 illustrates an architecture related to the structure of semantic domains in an embodiment of the invention. Abstract query 200 references the definition of existing multiple semantic abstractions 202, 204. The semantic abstractions describe underlying data sources 218 and 220, where the underlying data sources include relational data sources 218 and OLAP data sources 220.

Each of the semantic abstractions 202, 204 contains groups of defined data model objects 210, 212. These groups of data model objects can contain any number of data model objects or can exist as an empty collection. The types of data model objects contained in the data model object groups include objects representing base dimensions, base attributes, base measures, calculated dimensions, calculated attributes, and/or calculated measures. The base dimensions, attributes and measures describe aspects of the underlying data sources 218, 220. The query engine 118 receives the abstract query 200 that has been defined based on semantic abstractions 202, 204. Based on this abstract query 200, the query engine 118 constructs database specific queries 214 that are executed on the underlying data sources 218, 220. Typically, staged data 222 is constructed, and based on further optional manipulation of the staged data, a data result 224 is produced. In another implementation, the data result 224 is produced directly based on the database specific queries 214.

Figure 3:
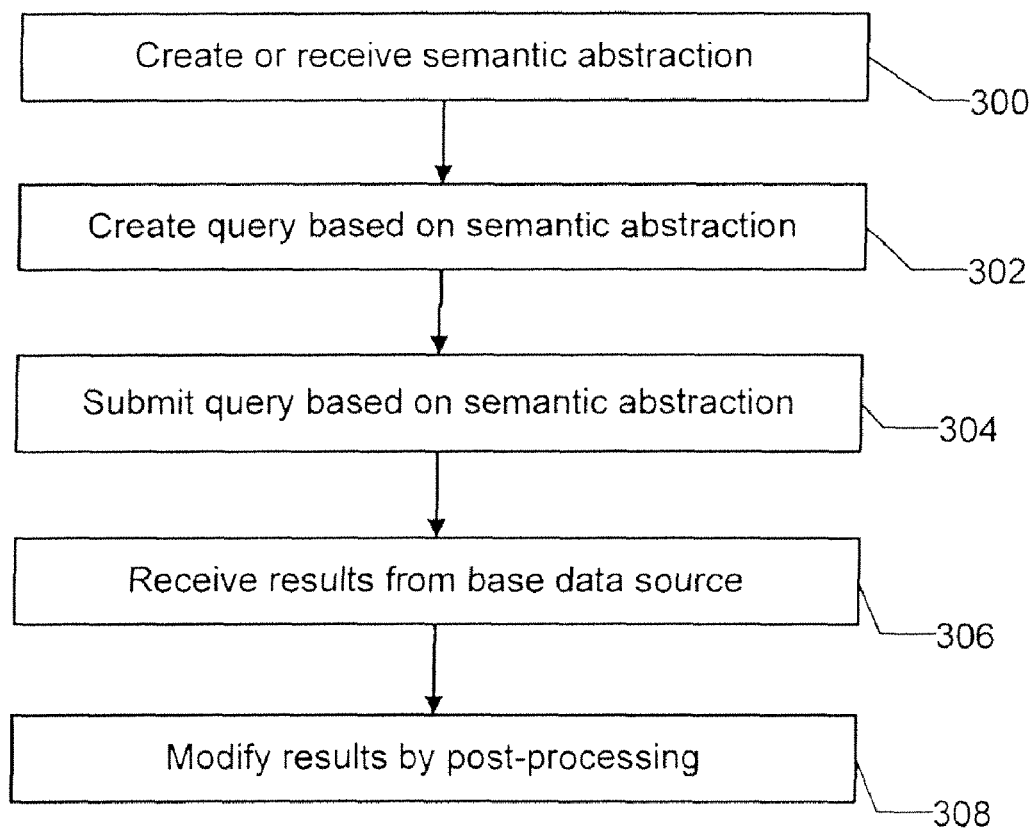
FIG. 3 illustrates a high level workflow in accordance with an embodiment of the invention.

FIG. 3 illustrates a high level workflow associated with an embodiment of the invention. Create or receive a semantic abstraction 300 provides the abstracted view of the underlying data sources. The semantic abstraction can be a semantic layer or semantic domain. Create a query based on semantic abstraction 302 creates a query that is based on the abstracted view of the underlying data source. This query can be created using an expression language, client application tool, other GUI interface, and the like. Submit query based on semantic abstraction 304, submits the query to the query engine 118. The query engine processes the query in accordance with workflows, such as those illustrated in FIGS. 4-7 and 9. This processing is not apparent to the user or client application. Receive results from data source 306 provides the results from applying the meaning of the abstract query to one or more specific underlying data sources. The results may be modified by post-processing 308, for example, by the query engine 118. The results may be returned from the underlying data source without further processing.

Figure 4:
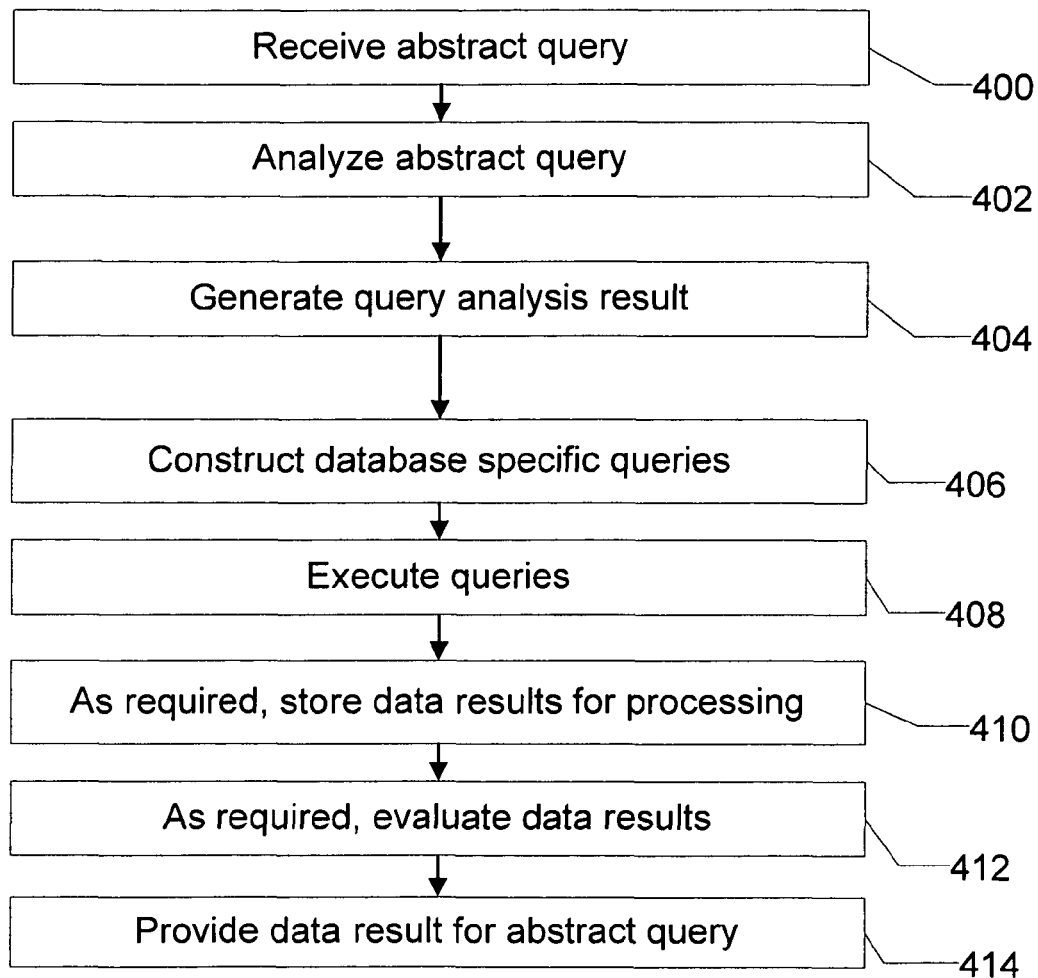
FIG. 4 illustrates a more detailed workflow for processing of a query in accordance with an embodiment of the invention.

FIG. 4 illustrates a high level workflow for processing an abstract query in accordance with an embodiment of the invention. Initially, a query is received 400. The abstract query contents include one or more of the following: a dimension, attribute, measure, calculated dimension, calculated attribute, calculated measure, calculation, filter, and the like. The abstract query may also contain more than one of each of these items or any combination of these items. The abstract query is then analyzed 402. This analysis determines member and level dependencies for any calculations within the abstract query and values that are required by the abstract query. In an embodiment, based on this analysis, the query analysis results constitute a modified abstract query definition. Generate query analysis results 404 generates a summary of the query's requirements and dependencies. The query analysis results are not necessarily a specific output or discrete result set. Construct database specific query 406 generates the one or more queries required to represent the abstract query in database specific queries.

Construct database query 406 includes re-factoring the abstract query to use the specific syntax of the underlying database type as well as the specific structure of the data contained within the database. Execute queries 408 passes the one or more queries to the underlying data source for execution. Store data results for processing 410 stores the data results in memory as required. In a workflow where there is no post processing of the returned data, storing 410 and evaluating 412 are optional—the results may be passed directly to the requesting client application. Evaluate data results 412 enables post processing of the returned data to apply calculations or other processing that was not pushed down to the database as required. The storage of data 410 and evaluation of data 412 may be dependent on whether the abstract query results in multiple database specific queries, or queries against multiple data sources and the like. Evaluate data results includes calculations, filtering, sorting, grouping, formatting, and the like. Provide data result for the abstract query 414 passes the query results to the requesting client application. In the case where post processing is performed on the data result, the modified data result is passed to the client requesting application. In one embodiment of the invention, both the unevaluated data returned from querying the underlying data source and the data set resulting from post processing are passed to the client application.

Figure 5:
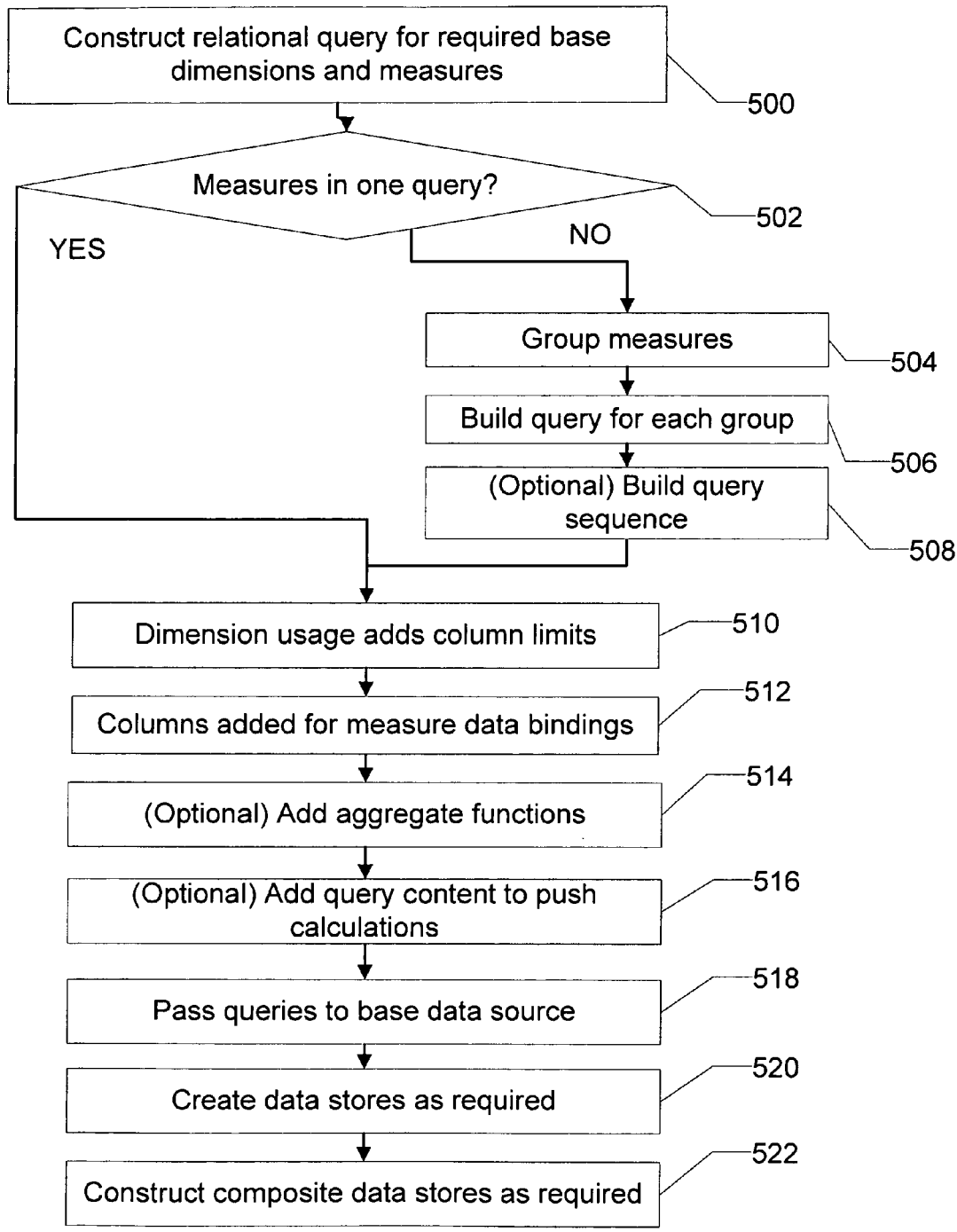
FIG. 5 illustrates a workflow for constructing a database specific query for an underlying relational data source in accordance with an embodiment of the invention.

FIG. 5 illustrates a specific workflow in accordance with an embodiment of the invention for querying an underlying relational data source. FIG. 5 generally corresponds to blocks 404-410 in FIG. 4. Construct database specific query for required base dimensions and measures 500 uses the analyzed abstract query as a basis for constructing the query. Required base dimensions and measures include the dimensions and measures explicitly requested in the query. Required base dimensions and measures may also include any dimensions and measures that are referenced by expressions for calculated dimensions and measures that are required to process the query.

Measures in one query 502 determines whether the measures can be evaluated in a single query. It may not be possible to query all the measures with a single database query. If measures have different dimensionality or come from tables which are not safely joinable, then multiple relational database queries will be required. If the measures cannot be in one query (502—NO), the measures are grouped 504. The base measures are grouped on dimensionality and query-compatibility. For each group, a relational database query is built 506. Optionally, query sequence is built 508 so an efficient sequence is used when executing the queries. At this point, the group of queries is then processed using the same workflow 510-524 as a single query. Dimension usage adds columns 510. In other words, each applicable dimension for the compatible measure group contributes columns corresponding to its data bindings to the query. Dimension usage adds filters 512 to limit columns and to limit the rows returned. Columns are added for measure data bindings 514. Each applicable measure for the compatible measure group contributes columns corresponding to its data bindings to the query. Add aggregate functions 516 typically adds an aggregation function (sum, count, min, max, and the like) to each measure column. Add query content to push calculations 518 adds content to the query when it is possible to push some or all of the processing of a calculated dimension or calculated measure to the database as part of the relational database query. Pass queries to base data source 520 passes the query to the underlying relational data source. Create data stores as required 522 creates storage for the returned data. For measure groups with identical dimensionality, the results are copied into the same data store. Construct composite data stores as required 524 occurs if the dimensionality within measure groups differs. In this event, separate data stores are constructed for the measure groups. Then, a composite data store is constructed to reference individual data stores.

Figure 6:
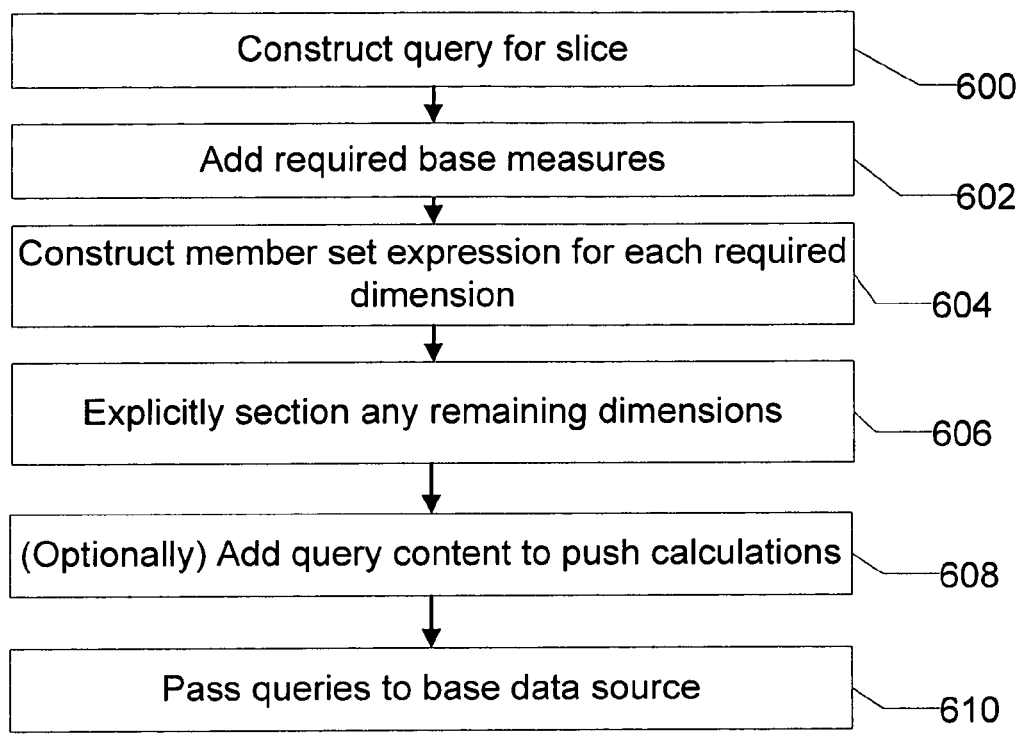
FIG. 6 illustrates a workflow for constructing a database specific query for an underlying OLAP data source in accordance with an embodiment of the invention.

FIG. 6 illustrates a specific workflow in accordance with an embodiment of the invention for querying an underlying OLAP data source. FIG. 6 generally corresponds to blocks 404-410 of FIG. 4. Construct query for slice 600 defines the basic query. An OLAP database query will be constructed to fetch a slice of data from the underlying cube based on the information in the query analysis results. Base measures are then added 602. The required base measures are added to the OLAP query, possibly as a member set expression. A member set expression is then constructed for each required dimension 604. A member set expression will be constructed for each required dimension based on the dimension usage information in the query analysis results. Any remaining dimensions are then explicitly sectioned 606. Any remaining dimensions in the cube are explicitly sectioned to the default member in the OLAP query. Optionally, query content is added to push calculations 608. That is, the OLAP data source adds content to the query when it is possible to push some or all of the processing of a calculated dimension or calculated measure to the database as part of the OLAP query. Queries are then passed to data sources 610.

Figure 7:
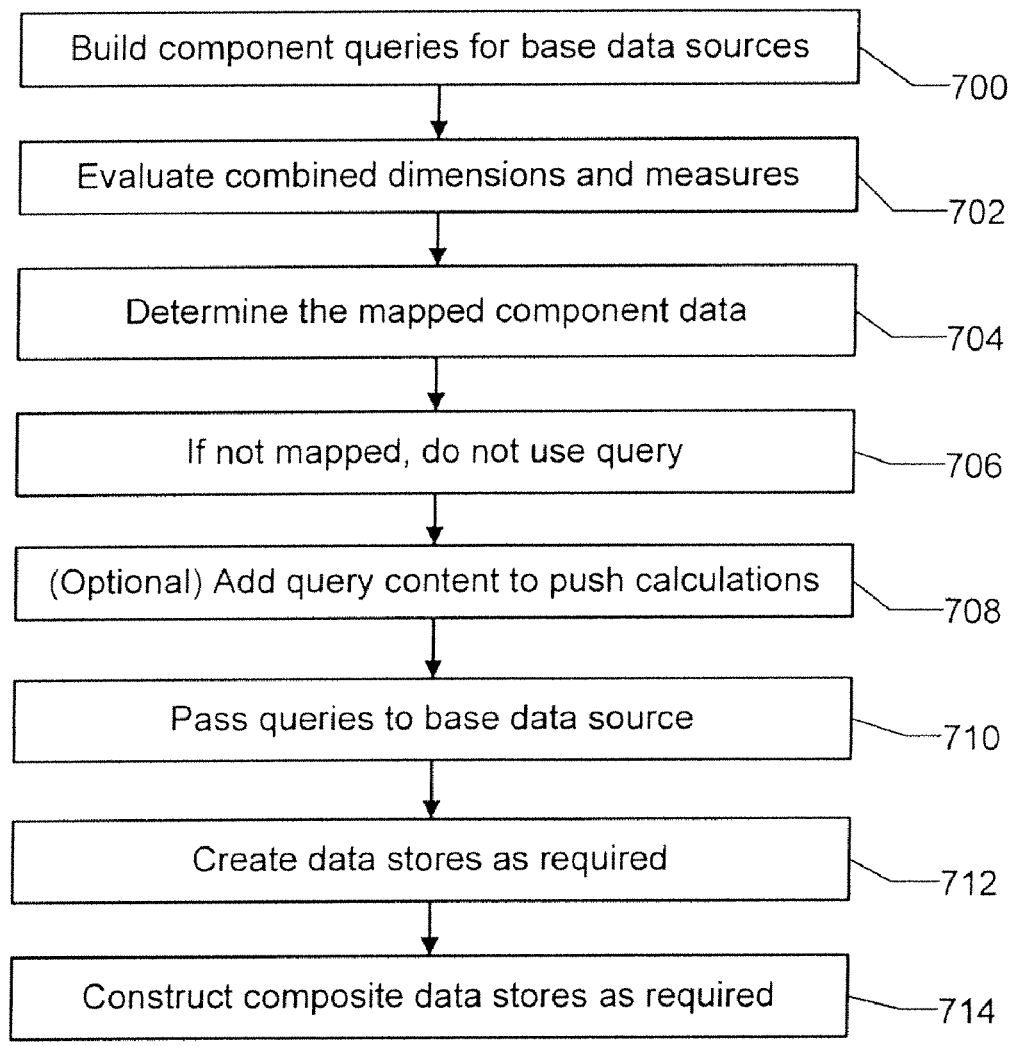
FIG. 7 illustrates a workflow for constructing a database specific query for combined underlying data sources in accordance with an embodiment of the invention.

FIG. 7 illustrates a specific workflow in accordance with an embodiment of the invention for querying a combination of underlying data sources. FIG. 7 generally corresponds to blocks 406-410 of FIG. 4. The combination of underlying data sources includes multiple relational data sources, multiple OLAP data sources, combined relational and OLAP data sources, relational and combined data sources, OLAP and combined data sources, and/or multiple combined data sources, where a combined data source represents any of the listed potential combinations.

Component queries for base data sources are built 700. These queries are built using the processes indicated in the initial steps before the query is passed to the underlying data source in FIGS. 5 and 6. Building the queries includes mapping the required dimension members and measures from the query analysis onto each component domain, building a query for each component domain to retrieve its contributing values, and/or converting the dimension member sets and measure references to the corresponding ones in the component domain.

Combined dimensions and members are evaluated 702. This operation includes evaluating the required dimension and measure information from the query analysis results that will be mapped onto each component domain to determine its required data. The mapped component data is determined 704. This operation identifies the dimension members and members corresponding to the dimension members and members in the query. Some items in the combined domain may not have a mapping to a component domain. If a component query is not mapped, it will not be run 706. If none of the required base measures have mappings in a component domain, then no query runs against that component domain. Similarly, if the required part of any of the combined dimensions has no mapping to a component domain, then no query runs against that component domain. Optionally, query content is added to push calculations 708. The underlying data source adds content to the query when it is possible to push some or all of the processing of a calculated dimension or calculated measure to the database as part of the query.

Queries are then passed to base data sources 710. Typically, there are two or more underlying data sources, but based on the evaluation of whether queries are mapped 704, not all underlying data sources may be queried by the database specific queries based on the abstract query. Similarly, the combined data sources may be two or more views of the same underlying data source combined together. In this case, only one data source is queried.

Data stores are then created as required 712. This includes creating a data store for an underlying data source and in the case of certain underlying data sources for each query or query group where measure groups do not share identical dimensionality. Composite data stores are constructed as required 714. This occurs when there is more than one underlying data source or if the dimensionality within measure groups differs. In the case that multiple data stores have been constructed, a composite data store is constructed to reference these individual data stores.

Figure 8:
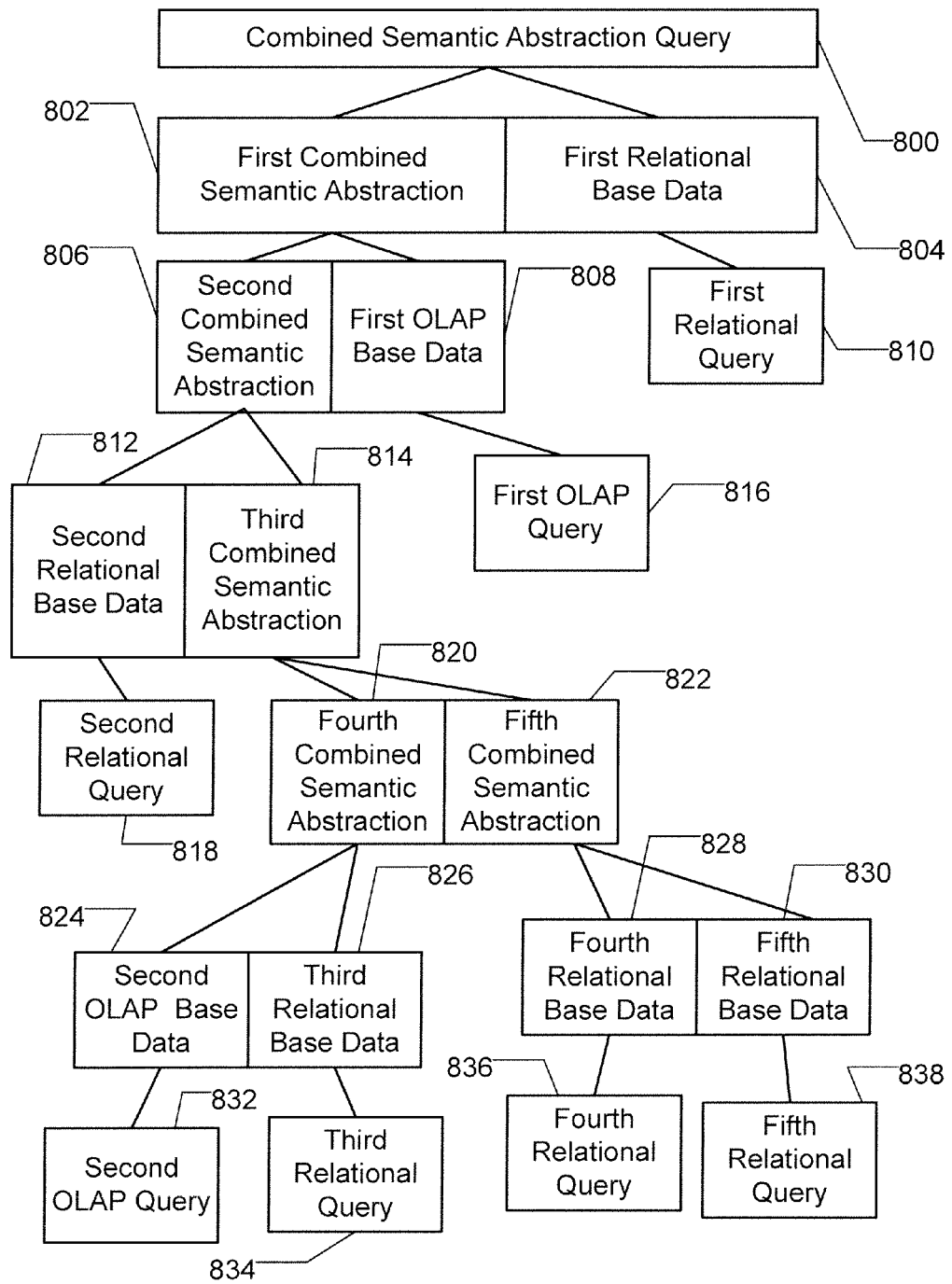
FIG. 8 provides an example of query complexity generated from combined data sources in accordance with an embodiment of the invention.

FIG. 8 provides an example of the potential complexity arising from a query against a combined semantic abstraction where the combined semantic abstraction contains nested combined semantic abstractions. In this example, combined semantic abstraction query 800 is based on a combined semantic abstraction containing first combined semantic abstraction 802 and first relational base data 804. The first combined semantic abstraction 802 includes second combined semantic abstraction 806 and first OLAP base data 808. The second combined semantic abstraction 806 contains second relational base data 812 and third combined semantic abstraction 814. The third combined semantic abstraction 814 contains fourth combined semantic abstraction 820 and fifth combined semantic abstraction 822. The fourth combined semantic abstraction 820 contains second OLAP base data 824 and third relational base data 826. The fifth combined semantic abstraction 822 contains fourth relational base data 828 and fifth relational base data 830 respectively. The single combined semantic abstraction query 800 contains multiple distinct queries including a first relational query 810, a first OLAP query 816, a second relational query 818, a second OLAP query 832, a third relational query 834, a fourth relational query 836, and a fifth relational query 838. Depending on the structure of the abstract query and the underlying data source, multiple data source specific queries may result from each distinct query within the abstract query. This figure is not intended to represent a specific combined semantic abstraction query but rather to be illustrative of the potential complexity of queries based on a combined semantic abstraction.

Figure 9:
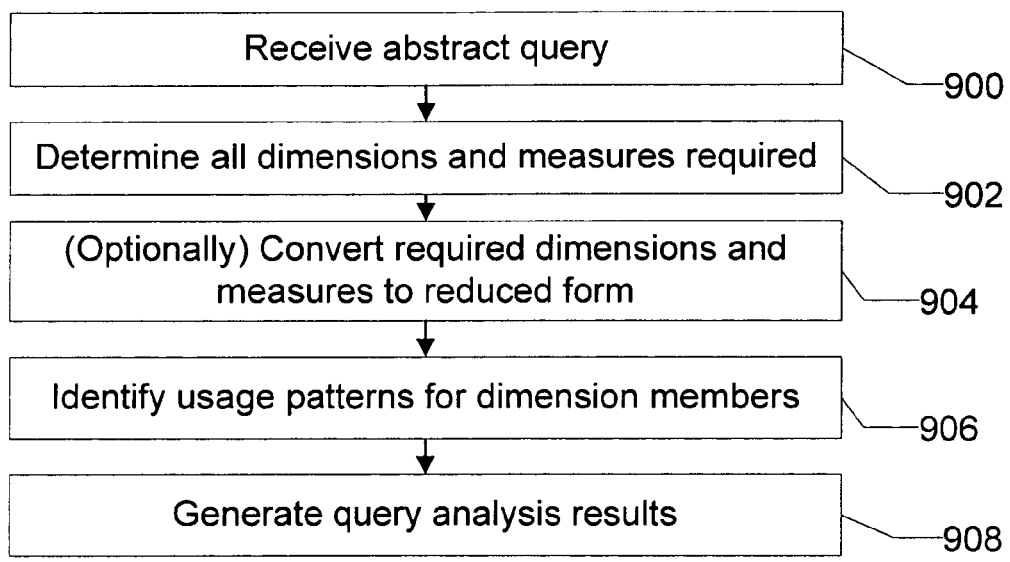
FIG. 9 provides a workflow for analyzing the abstract query in accordance with an embodiment of the invention.

FIG. 9 illustrates further processing associated with block 402 in FIG. 4 in accordance with an embodiment of the invention. An abstract query is received 900. The abstract query provides a query based on the semantic abstraction. Optionally, dimensions and measures are converted to reduced form 904. This reduction can involve evaluating constant parts of the expression, replacing parts of an expression with a simpler form, replacing references to data model objects by ID and or name with index values for faster lookup, and the like. The reduction that is used in one embodiment adds efficiencies both in the final query processing and in the analysis of the expressions by the query engine 118. In one embodiment, this conversion to reduced form 904 occurs after step 902 (as illustrated in FIG. 9).

All dimensions and measures that are required are then determined 902. This includes determining the full set of dimensions and measures (based and calculated) required to satisfy the query. This include the dimensions and measures explicitly requested in the query as well as any dimensions and measures that are referenced by expressions for calculated dimensions and measures that are required to process the query. For example, including an attribute in the query may include a dimension that is required to provide the attribute values.

Usage patterns for dimension members are identified 906. This analysis provides information used when building the database-specific queries to reduce the amount of data brought back from the underlying database. The identification starts with what is explicitly requested in the query for a dimension, and is expanded based on how the dimension is used in the various expressions involved in the query.

One usage pattern that is identified is references to dimension members in expressions. This is effective for expressions that refer to specific dimension members, or a translation of such an expression. For example, if a query requested only the '2005' and '2006' members from a Time dimension and a calculated measure which compared Sales values to the previous Time period values, then the analysis determines that the '2004' member is required as well.

Another usage pattern identified is dimension level usage. This is effective for expressions which reference specific dimension levels, or a translation of such an expression. For example, if a query requests the Month level members from the Time dimension and a calculated measure that returns the ratio of Sales values to the parent Time period value, then the analysis determines that both the 'Year' and 'Month' levels are used for the Time dimension.

Other usage patterns track the sub-trees of the hierarchy that are used to determine where member descendents are referenced in an expression. Any number of dimension usage patterns can be used to optimize the query.

Based on this analysis, the query analysis results are generated 908. These results are then used as the foundation to build the database specific queries. This analysis of the abstract query before constructing database specific queries may occur recursively or based on an order other than that suggested in FIG. 9.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices.

Examples of computer code include machine code, such as produced by a compiler, and files containing higher-level code that are executed by a computer using an interpreter. For example, an embodiment of the invention may be implemented using Java, C#, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium, comprising executable instructions to:
receive an abstract query specifying a set of objects, wherein at least a portion of the set of objects is stored in a first semantic domain associated with an Online Analytical Processing (OLAP) data source and at least a portion of the set of objects is stored in a second semantic domain associated with a relational data source, the set of objects is defined by a combined semantic abstraction having at least one level of combined semantic abstraction data with relational data and at least one nested level of semantic abstraction data with OLAP base data;
analyze the abstract query to determine member and level dependencies for any calculations within the abstract query and to determine values that are required by the abstract query;
generate query analysis results based on the analysis of the abstract query, the query analysis results comprising a summary of requirements and dependencies of the abstract query;
construct, using the combined semantic abstraction, at least one first query of the OLAP data source based on the query analysis results by mapping required dimension members and measures from the query analysis results into the first semantic domain, building a query for the first semantic domain to retrieve its contributing values, and converting dimension member sets and measure references to corresponding dimension member sets and measure references in the first semantic domain;
add required base measures to the at least one first query, wherein the base measures are grouped into compatible measure groups based on dimensionality and query-compatibility such that queries are built for each compatible measure group and a sequence for executing the queries is built, wherein each applicable dimension for the corresponding compatible measure group contributes columns corresponding to its data bindings to the corresponding query, wherein dimension usage adds filters to limit columns and rows returned;
construct a member set expression for each dimension required by the at least one first query based on dimension usage information specified in the query analysis results;
section any dimensions that do not have a corresponding member set expression to a default dimension in the at least one first query;
add content to the at least one first query to push at least a portion of processing of a calculated dimension or calculated measure specified by the at least one first query to the OLAP data source;
pass the at least one first query to the OLAP data source for execution;
construct, using the combined semantic abstraction, at least one second query of the relational data source based on the abstract query;
pass the at least one second query to the relational data source for execution; and
receive and store results from the execution of the at least one first query and the at least one second query.

2. The computer readable storage medium of claim 1 further comprising executable instructions to determine all dimension dependencies.

3. The computer readable storage medium of claim 1 further comprising executable instructions to determine all measure dependencies.

4. The computer readable storage medium of claim 1 further comprising executable instructions to convert dimensions and measures to a reduced form.

5. The computer readable storage medium of claim 4 wherein the executable instructions to convert include executable instructions to evaluate constant parts of a query expression.

6. The computer readable storage medium of claim 4 wherein the executable instructions to convert the dimensions and the measures to the reduced form include executable instructions to replace parts of a query expression with a simpler form of the query expression.

7. The computer readable storage medium of claim 4 wherein the executable instructions to convert the dimensions and the measures to the reduced form include executable instructions to replace references to data model objects by name with index values.

8. The computer readable storage medium of claim 1 wherein the dimension usage is based on references to dimension members in query expressions.

9. The computer readable storage medium of claim 1 wherein the dimension usage is based on tracking of sub-trees in a dimension member hierarchy to determine if dimension member descendants are referenced in query expression.

10. A computer-implemented method comprising:
receiving an abstract query specifying a set of objects, wherein at least a portion of the set of objects is stored in a first semantic domain associated with an Online Analytical Processing (OLAP) data source and at least a portion of the set of objects is stored in a second semantic domain associated with a relational data source, the set of objects is defined by a combined semantic abstraction having at least one level of combined semantic abstraction data with relational data and at least one nested level of semantic abstraction data with OLAP base data;
analyzing the abstract query to determine member and level dependencies for any calculations within the abstract query and to determine values that are required by the abstract query;

generating query analysis results based on the analysis of the abstract query, the query analysis results comprising a summary of requirements and dependencies of the abstract query;

constructing, using the combined semantic abstraction, at least one first query of the OLAP data source based on the query analysis results by mapping required dimension members and measures from the query analysis results into the first semantic domain, building a query for the first semantic domain to retrieve its contributing values, and converting dimension member sets and measure references to corresponding dimension member sets and measure references in the first semantic domain;

adding required base measures to the at least one first query, wherein the base measures are grouped into compatible measure groups based on dimensionality and query-compatibility such that queries are built for each compatible measure group and a sequence for executing the queries is built, wherein each applicable dimension for the corresponding compatible measure group contributes columns corresponding to its data bindings to the corresponding query, wherein dimension usage adds filters to limit columns and rows returned;

constructing a member set expression for each dimension required by the at least one first query based on dimension usage information specified in the query analysis results;

sectioning any dimensions that do not have a corresponding member set expression to a default dimension in the at least one first query;

adding content to the at least one first query to push at least a portion of processing of a calculated dimension or calculated measure specified by the at least one first query to the OLAP data source;

passing the at least one first query to the OLAP data source for execution;

constructing, using the combined semantic abstraction, at least one second query of the relational data source based on the abstract query;

passing the at least one second query to the relational data source for execution; and receiving and storing results from the execution of the at least one first query and the at least one second query.

11. A system comprising:

one or more data processors within at least one computing system; and memory storing instructions, which when executed by at least one of the one or more data processors, result in operations comprising:

receiving an abstract query specifying a set of objects, wherein at least a portion of the set of objects is stored in a first semantic domain associated with an Online Analytical Processing (OLAP) data source and at least a portion of the set of objects is stored in a second semantic domain associated with a relational data source, the set of objects is defined by a combined semantic abstraction having at least one level of combined semantic abstraction data with relational data and at least one nested level of semantic abstraction data with OLAP base data;

analyzing the abstract query to determine member and level dependencies for any calculations within the abstract query and to determine values that are required by the abstract query;

generating query analysis results based on the analysis of the abstract query, the query analysis results comprising a summary of requirements and dependencies of the abstract query;

constructing, using the combined semantic abstraction, at least one first query of the OLAP data source based on the query analysis results by mapping required dimension members and measures from the query analysis results into the first semantic domain, building a query for the first semantic domain to retrieve its contributing values, and converting dimension member sets and measure references to corresponding dimension member sets and measure references in the first semantic domain;

adding required base measures to the at least one first query, wherein the base measures are grouped into compatible measure groups based on dimensionality and query-compatibility such that queries are built for each compatible measure group and a sequence for executing the queries is built, wherein each applicable dimension for the corresponding compatible measure group contributes columns corresponding to its data bindings to the corresponding query, wherein dimension usage adds filters to limit columns and rows returned;

constructing a member set expression for each dimension required by the at least one first query based on dimension usage information specified in the query analysis results;

sectioning any dimensions that do not have a corresponding member set expression to a default dimension in the at least one first query;

adding content to the at least one first query to push at least a portion of processing of a calculated dimension or calculated measure specified by the at least one first query to the OLAP data source;

passing the at least one first query to the OLAP data source for execution;

constructing, using the combined semantic abstraction, at least one second query of the relational data source based on the abstract query;

passing the at least one second query to the relational data source for execution; and receiving and storing results from the execution of the at least one first query and the at least one second query.

* * * * *